United States Patent [19]

Nozawa et al.

[11] Patent Number: 4,543,625
[45] Date of Patent: Sep. 24, 1985

[54] METHOD FOR COMPENSATING FOR SERVO DELAY CAUSED AT AN ARC OR CORNER

[75] Inventors: Ryoichiro Nozawa, Tokyo; Hideaki Kawamura; Takao Sasaki, both of Hachioji, all of Japan

[73] Assignee: Fanuc Ltd., Minamitsuru, Japan

[21] Appl. No.: 491,333

[22] PCT Filed: Aug. 27, 1982

[86] PCT No.: PCT/JP82/00343
§ 371 Date: Apr. 27, 1983
§ 102(e) Date: Apr. 27, 1983

[87] PCT Pub. No.: WO83/00755
PCT Pub. Date: Mar. 3, 1983

[30] Foreign Application Priority Data

Aug. 27, 1981 [JP] Japan .................... 56-134774

[51] Int. Cl.$^4$ .................. G05B 19/42; G05B 19/24
[52] U.S. Cl. .................................. 364/169; 364/174;
364/474; 318/571; 318/573
[58] Field of Search ............. 364/168, 169, 474, 174;
318/571, 573, 574, 39

[56] References Cited

U.S. PATENT DOCUMENTS

| | | | |
|---|---|---|---|
| 3,428,876 | 2/1969 | Kelling | 364/168 |
| 3,793,511 | 2/1974 | Bala et al. | 364/174 |
| 3,864,613 | 2/1975 | Cutler | 318/573 |
| 3,952,238 | 4/1976 | Cutler | 318/571 |
| 3,979,653 | 9/1976 | Cutler | 318/571 |
| 4,079,235 | 3/1978 | Froyd et al. | 364/169 |
| 4,163,184 | 7/1979 | Leenhouts | 318/573 |
| 4,266,375 | 5/1981 | Nishimura et al. | 364/174 |
| 4,348,731 | 9/1982 | Kogawa | 364/174 |
| 4,409,650 | 10/1983 | Noguchi | 364/169 |

Primary Examiner—Jerry Smith
Assistant Examiner—John R. Lastora
Attorney, Agent, or Firm—Staas & Halsey

[57] ABSTRACT

A numerical control method for executing numerical control processing using a numerical control unit (102), based on a machining program having plural items of command data recorded on an NC tape (101). Under the numerical control method, numerical control processing is executed based on a succeeding item of command data which has been preread or which has been read after completion of numerical control processing based on an item of preceding command data. An upper limit feed speed ($V_L$, $V_C$), based on a workpiece shape commanded by the machining program and on an allowable machining error, is previously determined and stored in registers (RG1, RG2). The magnitude of the upper limit feed speed ($V_L$, $V_C$) and the magnitude of an actual feed speed (Vi) is compared, and the actual feed speed is clamped to the upper limit feed speed $V_L$, $V_C$, even when Vi exceeds $V_L$ or $V_C$.

4 Claims, 8 Drawing Figures

METHOD FOR COMPENSATING FOR SERVO DELAY CAUSED AT AN ARC OR CORNER

BACKGROUND OF THE INVENTION

This invention relates to a numerical control method. More particularly, the invention relates to a numerical control method wherein a machining error which occurs in cutting a corner portion, as well as a radially directed machining error which occurs in cutting an arc, is capable of being held within allowable limits.

A so-called data prereading techniques is used as a method of reading data in a numerical control device. The reasons are as follows. In a method which does not rely upon the prereading technique, a succeeding block of NC data is read each time machining or movement ends. This is followed by a format check, decoding, calculation of an amount of movement (incremental values), and by other preprocessing, after which machining or movement is controlled based upon the succeeding block. With this conventional method, however, machining efficiency declines because movement based on the succeeding data does not start until after the time required for preprocessing. It is for this reason that the above-mentioned data prereading technique has come to be used. With this technique, as illustrated in FIG. 1, when numerically controlled machining based on the current block, e.g., the first block B1, is in progress as indicated at W1, NC data in the succeeding block B2 is preread and preprocessing based on the succeeding block B2 is performed in advance, in parallel with NC machining control W1 based on the current block B1. Then, simultaneous with the completion of NC machining control specified by the current block B1, NC machining control W2 is performed on the basis of the NC data in the succeeding block B2. According to the data prereading method, movement based on the NC data in the succeeding block can therefore be executed immediately without waiting for the completion of preprocessing following movement based on the NC data in the current block. The result is a more efficient machining operation.

When turning at a corner portion or cutting an arc in accordance with numerical control based on the foregoing prereading method, a slight deviation develops between the tool path (the path followed by the center of the tool) and the commanded path, as shown in FIGS. 2 and 3. This is caused by a servo delay, such as an exponential acceleration/deceleration characteristic and the characteristic of the DC servomotor used. In FIGS. 2 and 3, the solid lines indicate the commanded path, and the dashed lines show the tool path. The tool path is dependent upon the following:

(a) feed speeds V1, V2 prior to and following a corner;
(b) corner angle $\theta$;
(c) time constant T1 of exponential acceleration/deceleration during cutting; and
(d) time constant T2 of motor used. In other words, the difference between the tool path and commanded path depends upon these parameters. The difference between the tool path and commanded path results in a machining error which is required to be held within allowable limits. To this end, according to the prior art, programming is performed during the creation of an NC tape to set the feed speeds so that the error will fall within the allowable limits. Alternatively, dwell command (G04) is inserted between items of command data corresponding to the blocks on either side of a corner to introduce a dwell period of suitable duration. Consequently, programming becomes extremely complicated and the tape grows to a great length. Also, since machining error generally differs from one controlled machining tool to another, programming must be performed for each machine tool, requiring considerable time and effort for the creation of NC tapes.

SUMMARY OF THE INVENTION

Accordingly, an object of the present invention is to provide a numerical control method wherein machining error caused by servo delay in cutting a corner or arc need not be taken into consideration, thereby enabling an NC tape to be created in a simple manner with a reduced length, and eliminating the need to create a separate NC tape for each machine tool.

According to the numerical control method of the present invention, numerical control processing is executed based on a machining program having plural items of command data. In particular, numerical control processing is executed based on a succeeding item of command data which has been preread, or which has been read after completion of numerical control processing based on an item of preceding command data. An upper limit feed speed is determined based on a workpiece shape commanded by the machining program and on an allowable machining error. The actual feed speed is clamped to the upper limit feed speed even when a feed speed greater than the upper limit feed speed is commanded. The method of the present invention also includes a numerical control method for executing numerical control processing based on a machining program having plural items of command data wherein numerical control processing is executed based on a succeeding item of command data which has been preread or which has been read after completion of numerical control processing based on an item of preceding command data, wherein the start of a pulse distribution operation is delayed, based on the following command data, in accordance with a workpiece shape commanded by the machining program and an allowable machining error. According to the present invention, feed speed is automatically limited or pulse distribution timing in a following block is delayed, so that a machining error will not exceed an allowable error even when an NC tape is created without taking the machining error into consideration. The machining error is caused by a servo delay during cutting of a corner or arc. Consequently, creation of the NC tape is greatly simplified and tape length is reduced since it is unnecessary to use instructions such as a dwell instruction G04. There is also no need to create an NC tape for each machine tool.

DESCRIPTION OF THE PEFERRED EMBODIMENTS

Figure 1:
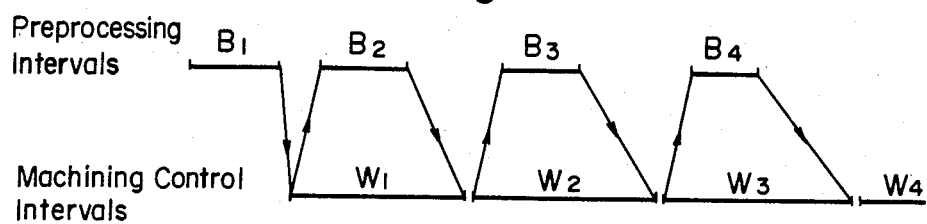
FIG. 1 is a diagram used to describe data prereading.
Figure 2:
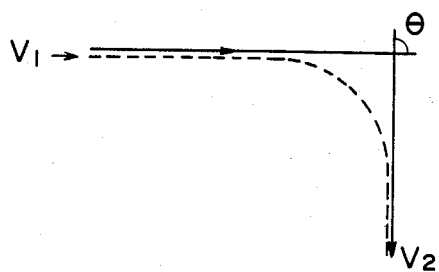
FIGS. 2 and 3 are diagrams used to describe cutting error in corner machining and arc cutting.
Figure 3:
Figure 4:
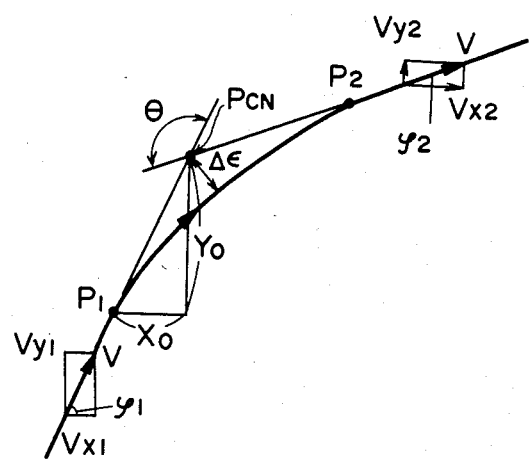
FIG. 4 is a diagram used to describe a tool path at a corner portion.

FIG. 4 is a diagram used to describe the tool path at a corner portion. We will assume that feed speed V is constant on either side of a corner portion $P_{CN}$, that command data is read in accordance with the prereading method, and that the coordinates of the corner portion $P_{CN}$ are (0,0). Feed speed $Vx(t)$ along the X axis and feed speed $Vy(t)$ along the Y axis for machining a corner portion bounded by points P1 and P2, are approximated by the following equations. The bold line in FIG. 4 indicates the path of a tool, and the fine line shows the commanded path.

$$Vx(t) = (Vx_2 - Vx_1)\left[1 - \frac{1}{T_1 + T_2}\left\{T_1 \cdot \exp\left(-\frac{t}{T_1}\right) - T_2 \cdot \exp\left(-\frac{t}{T_2}\right)\right\}\right] + Vx_1 \quad (1)$$

$$= \frac{Vx_1 - Vx_2}{T_1 + T_2}\left\{T_1 \cdot \exp\left(-\frac{t}{T_1}\right) - T_2 \cdot \exp\left(-\frac{t}{T_2}\right)\right\} + Vx_2$$

$$Vy(t) = \frac{Vy_1 - Vy_2}{T_1 + T_2}\left\{T_1 \cdot \exp\left(-\frac{t}{T_1}\right) - T_2 \cdot \exp\left(-\frac{t}{T_2}\right)\right\} + Vy_2 \quad (2)$$

Accordingly, the coordinates of the tool path at a time t may be calculated from the following formulae, wherein the time at point P1 is t=0.

$$X(t) = \int_0^t Vx(t)dt - X_o \quad (3)$$

$$= \frac{Vx_2 - Vx_1}{T_1 - T_2}\left\{T_1^2 \cdot \exp\left(-\frac{t}{T_1}\right) - T_2^2 \cdot \exp\left(-\frac{t}{T_2}\right)\right\} - Vx_2(T_1 + T_2 - t)$$

$$Y(t) = \int_0^t Vy(t)dt - Y_o \quad (4)$$

$$= \frac{Vy_2 - Vy_1}{T_1 - T_2}\left\{T_1^2 \cdot \exp\left(-\frac{t}{T_1}\right) - T_2^2 \cdot \exp\left(-\frac{t}{T_2}\right)\right\} - Vy_2(T_1 + T_2 - t)$$

where:
$Vx_1 = V \cdot \cos \phi_1$
$Vy_1 = V \cdot \sin \phi_1$
$Vx_2 = V \cdot \cos \phi_2$
$Vy_2 = V \cdot \sin \phi_2$
$\pi - (\phi_1 - \phi_2) = \theta$
$Xo = Vx_1(T1 + T2)$
$Yo = Vy_1(T1 + T2)$ Further,
T1: acceleration/deceleration time constant
T2: feed speed in blocks preceding and following corner
$Vx_1$: X-axis component of feed speed in preceding block
$Vy_1$: Y-axis component of feed speed in preceding block
$Vx_2$: X-axis component of feed speed in following block
$Vy_2$: Y-axis component of feed speed in following block
$\theta$: corner angle
$\phi_1$: angle defined by X axis and direction of commanded path in preceding block
$\phi_2$: angle defined by X axis and direction of commanded path in following block The maximum error will therefore be given by the following:

$$\Delta \epsilon = \sqrt{\max X(t)^2 + Y(t)^2} \quad (5)$$

so that the magnitude of $\Delta\epsilon$ can be controlled by varying the acceleration/deceleration constant T1 or feed speed V. It should be noted that the right side of Eq. (5) signifies the maximum value of $\sqrt{X(t)^2 + Y(t)^2}$.

Figure 5:
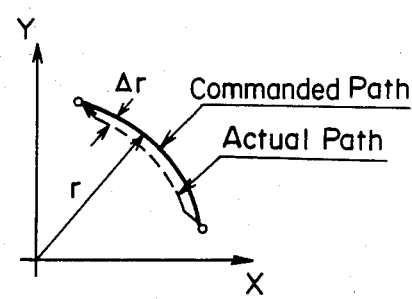
FIG. 5 is a diagram used to describe a radially directed machining error when cutting an arc.

FIG. 5 is a diagram used to describe a radially directed error when cutting an arc, in which the solid line indicates the command path and the dashed line the path actually followed by the tool. In order for acceleration and deceleration to take place smoothly, an NC device uses an acceleration/deceleration circuit for increasing and decreasing commanded speed exponentially, with the output following a command through a first-order delay. When a DC servomotor is used, moreover, a delay attributed to the motor arises, resulting in an error of $\Delta r$ in the radial direction, shown in FIG. 5, when performing circular interpolation. If we let $\Delta r$ be the maximum value (mm) of the radially directed error, V the feed speed (mm/sec), r the arc radius (mm), T1 the acceleration/deceleration time constant (sec) during cutting, and T2 the time constant of the DC motor, then $\Delta r$ will be expressed by the following equation:

$$\Delta r = \tfrac{1}{2}(T^2_1 + T^2_2)(V^2/r) \quad (6)$$

Accordingly, the magnitude of $\Delta r$ can be controlled by varying the acceleration/deceleration time constant T1 or the feed speed V, just as described above in connection with the machining error $\Delta\epsilon$ when cutting a corner.

Figure 6:
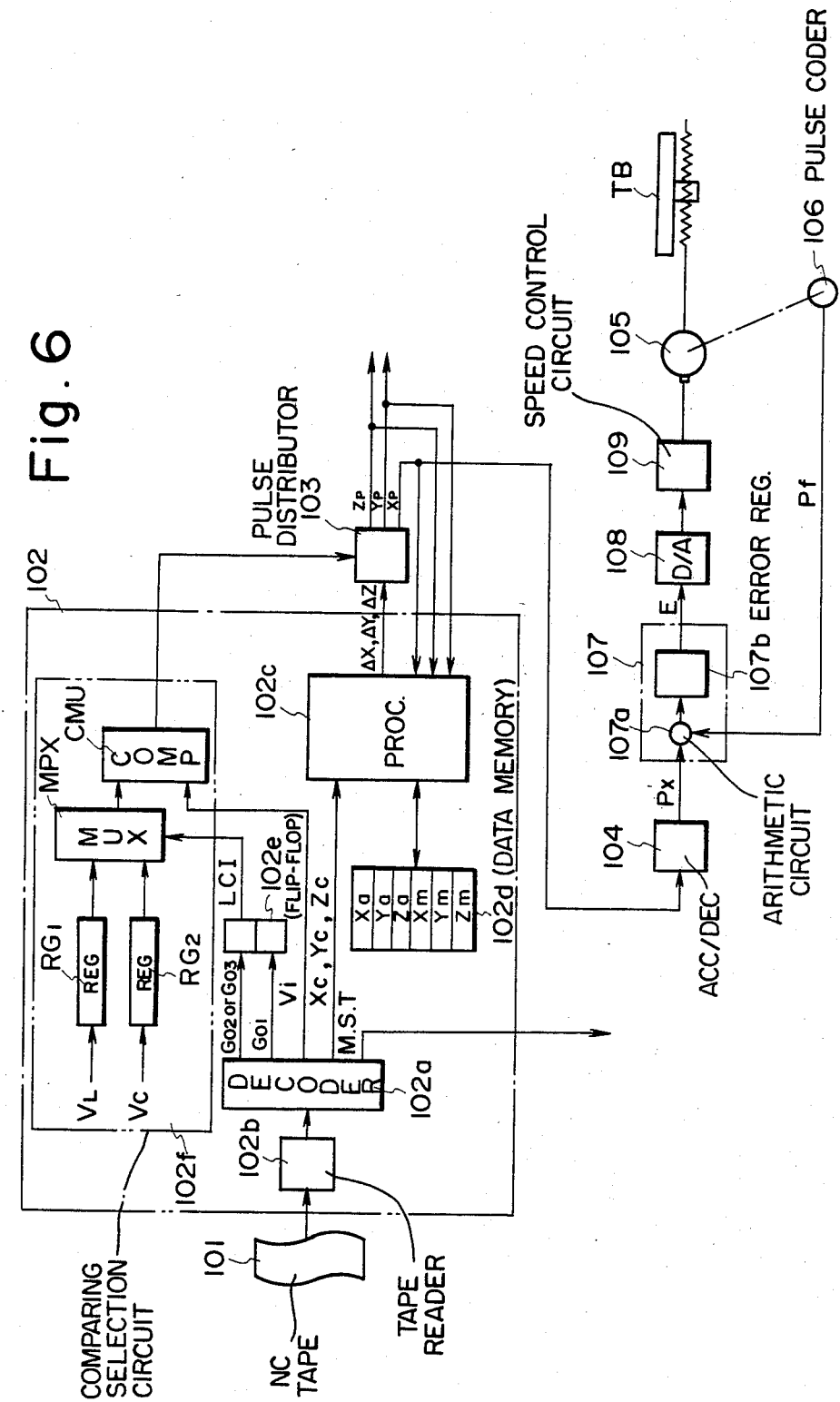
FIG. 6 is a block diagram of a system for performing a first embodiment of the method of the present invention.

FIG. 6 is a block diagram of a system for realizing the numerical control method of the present invention.

In FIG. 6, numeral 101 denotes an NC tape on which NC command data are recorded, and 102 a control unit for reading the NC data from the NC tape 101 via a tape reader 102b, for decoding the read NC data by a decoding unit 102a, for delivering e.g., M, S and T function instructions to a machine through a power magnetics panel (not shown) when the instructions are the read NC data, and for executing preprocessing by a processor 102c when the NC data is path data. The results of the preprocessing are delivered to a pulse distributor 103, which is the next stage. If we assume that the path data is given on the basis of an absolute command, then the processor 102c uses the following formula to obtain the differences (incremental values) $\Delta X$, $\Delta Y$, $\Delta Z$ between commanded position data Xc, Yc, Zc and present position data Xa, Ya, Za, along the respective axes, stored in a data memory 102d:

$$Xc - Xa \rightarrow \Delta X, Yc - Ya \rightarrow \Delta Y, Zc - Za \rightarrow \Delta Z \qquad \ldots (7)$$

These difference values are delivered to the pulse distributor 103. In addition, these differences $\Delta X$, $\Delta Y$, $\Delta Z$ are stored, as remaining amounts of movement, in a storage area for remaining amounts of movement located in the data memory 102d. In other words, $\Delta X$, $\Delta Y$ and $\Delta Z$ are stored in the form:

$$Xm = \Delta X, Ym = \Delta Y, Zm = \Delta Z$$

Each time the pulse distributor 103 generates distributed pulses Xp, Yp, Zp for the respective axes, the processor 102c performs the following operations to monitor the remaining amount of movement:

$$Xm - 1 \rightarrow Xm, Ym - 1 \rightarrow Ym, Zm - 1 \rightarrow Zm \qquad (8)$$

Further, the processor 102a performs the following operations to update the present position in the data memory 102d:

$$Xa + \Delta X \rightarrow Xa, Ya + \Delta Y \rightarrow Ya, Za + \Delta Z \rightarrow Za \qquad (9)$$

The control unit 102 includes a flip-flop 102e and a comparing selection circuit 102f. The flip-flop 102e, which memorizes whether the prevailing mode is a linear interpolation mode or circular interpolation mode, is reset when a G function instruction (G01) for linear interpolation is commanded, and is set when a G-function instruction (G02 or G03) for circular interpolation is commanded. Delivered from the set output terminal is a signal LC1 indicative of whether the linear interpolation mode or circular interpolation mode is in effect. The circular interpolation mode will be in effect when the signal LC1 is "1", and the linear interpolation mode when the signal LC1 is "0". The comparing selection circuit 102f has registers RG1, RG2 for storing, respectively, an upper limit speed $V_L$ for linear cutting (computed in advance using Eq. (5) and an allowable error $E_T$), and an upper limit speed $V_C$ for arc cutting (similarly obtained from Eq. (6) and $E_T$). The comparing selection circuit 102t also includes a multiplexer MPX for delivering the upper limit speed $V_L$ or $V_C$ depending upon whether the signal LCI is "1" or "0", and a comparator CMU for comparing the magnitude of a commanded speed $V_i$ and the magnitude of the upper limit speed delivered by the multiplexer MPX, with the lower speed being delivered as an output.

When the commanded speed Vi is read in, therefore, the comparing selection circuit 102f compares the magnitudes of Vi and of the upper limit speed $V_L$ for linear cutting if the prevailing mode is the linear interpolation mode (signal LCI = "0"), and delivers Vi when the condition $Vi \leq V_L$ holds, or $V_L$ when $Vi > V_L$ holds.

If the prevailing mode is the circular interpolation mode (signal LCI = "1"), then the comparing selection circuit 102f compares the magnitudes of Vi and of the upper limit speed $V_C$ for arc cutting and delivers Vi when the condition $Vi \leq V_C$ holds, or $V_C$ when $Vi > V_C$ holds. Thus, when Vi is larger than $V_L$ or $V_C$, the output is clamped to $V_L$ or $V_C$. Numeral 103 denotes the pulse distributor which executes known pulse distribution computations based on the incremental values $\Delta X$, $\Delta Y$, $\Delta Z$ for producing distributed pulses Xp, Yp, Zp of a frequency corresponding to the speed delivered by the comparing selection circuit CMU. Numeral 104 denotes a known accelerator/decelerator circuit which generates a train of pulse Px by exponentially accelerating the pulse rate of the train of distributed pulses Xp at the occurrence of this pulse train and by exponentially decelerating the same at the end thereof. Numeral 105 indicates a DC motor by which a table TB or tool is driven. Numeral 106 denotes a pulse coder which generates one feedback pulse Pf each time the DC motor 105 rotates by a predetermined amount. Numeral 107 denotes an error calculating and storing unit which is constructed of, for example, a reversible counter, and which stores the difference E between the number of the input pulses Px received from the accelerator/decelerator circuit 104 and that of the feedback pulses Pf. This error calculating and storing unit may be constructed, as shown in the Figure, of an arithmetic circuit 107a for calculating the difference E between the numbers of the pulses Px and Pf, and an error register 107b for storing the error E. More specifically, assuming that the DC motor 105 is rotating in the + direction, the error calculating and storing unit 107 operates in such a manner that each time the input pulse Px is generated the pulse is counted up, while each time the feedback pulse Pf is generated, the content is counted down, and that the differences E between the number of input pulses and the feedback pulses is stored in the error register 107b. Numeral 108 denotes a DA converter for generating an analog voltage proportional to the content of the error register 107b, and numeral 109 denotes a speed control circuit.

The upper limit speeds $V_L$, $V_C$ for linear and arc cutting, respectively, are computed in advance and fed into the respective registers RG1, RG2. When an item of NC data read in from the NC tape 101 under these conditions is a path command, the command speed Vi contained in the path is decoded by the decoder 102a and applied to the comparator CMU of the comparing selection circuit 102f. Meanwhile, the signal LCI indicative of the linear interpolation mode or circular interpolation mode, is being applied to the multiplexer MPX of the comparing selection circuit 102f. As a result, the multiplexer MPX delivers $V_L$ or $V_C$, depending upon whether the signal LCI is "1" or "0". The comparator CMU compares the magnitude of the commanded speed Vi against the magnitude of $V_L$ or $V_C$ and applies the lower speed to the pulse distributor 103. In parallel with the foregoing, the processor 102c executes the operation given by expression (7) to compute the incremental values $\Delta X$, $\Delta Y$, $\Delta Z$, and applies the incremental values to the pulse distributor 103.

The pulse distributor 103 produces the distributed pulses Xp, Yp, Zp by executing a pulse distribution computation based on the incremental values $\Delta X$, $\Delta Y$, $\Delta Z$ and the speed data from the comparator CMU. Upon receiving the pulses Xp, the accelerator/decelerator circuit 104 accelerates the pulses rate thereof during the positive-going transition and decelerates the pulse rate thereof during the negative-going transition, and applies the train of command pulses Px to the error calculating and storing circuit 107. Thus, the content of the error register 107b becomes non-zero, so that the DA converter 108 provides a voltage, and the error E between the number of commanded pulses Px and the number of feedback pulses Pf is stored in the error register 107b. Thereafter, servo control is applied so as to make the difference E approach zero, whereby the table TB is moved toward a target position or along a commanded path at the speed delivered by the comparator, and is then brought to a stop. Accordingly, the speed of a movable element, such as a table or tool, is held below a predetermined speed so that a machining error incurred during corner cutting or arc cutting will not exceed an allowable error.

In the foregoing case, the feed speed in the blocks on either side of the corner is held below a predetermined speed. Other specific methods of controlling feed speed are as follows:

(a) Of the blocks preceding and following a corner, the speed near an end point in the preceding block is lowered.

(b) Of the blocks preceding and following a corner, the speed near a starting point (corner) in the following block is lowered.

(c) Both the methods of (a) and (b) are practiced.

In effecting speed control, the timing for lowering the speed in (a) is decided by monitoring the amount of movement which remains, the speed being lowered when the remaining amount of movement falls below a predetermined value. In (b), the amount of movement from the corner portion is monitored, with the speed being held low until the amount of movement surpasses a predetermined value.

Figure 7:
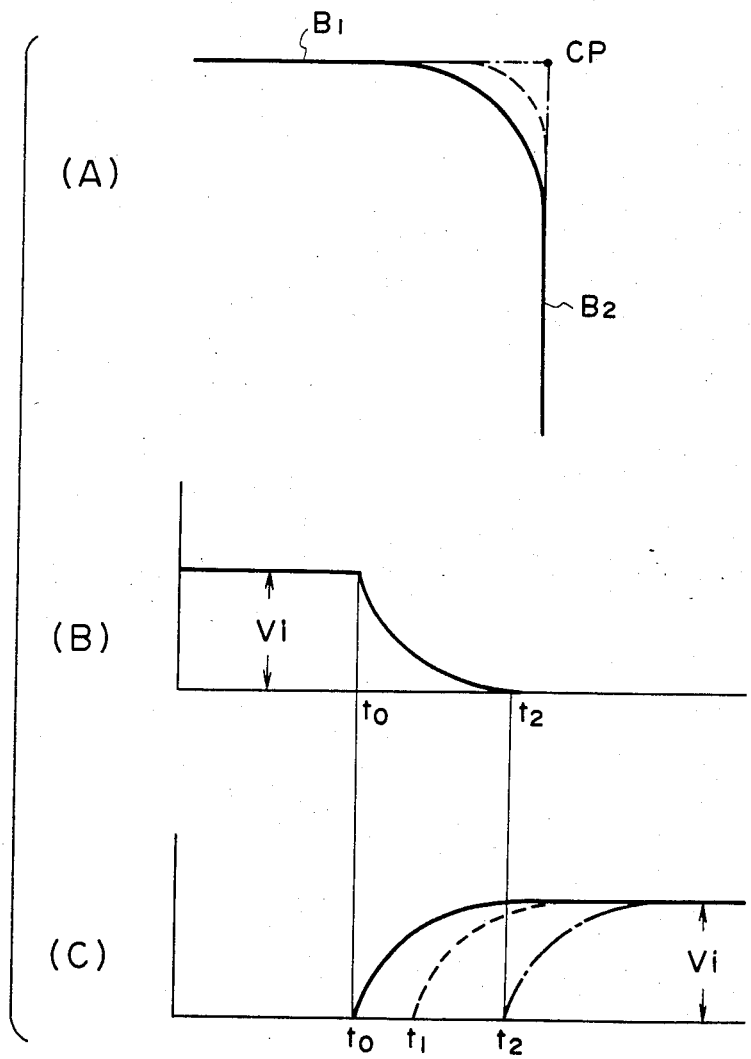
FIG. 7 is a diagram used to describe the relationship between a delay time and machining error when the time for a pulse distribution in a succeeding block is delayed.

In the foregoing description, an upper limit on possible feed speeds is found in advance and feed speed is clamped to the upper limit when a feed speed in excess of the upper limit is commanded. In accordance with the machined shape and allowable error, however, it is also possible to hold a machining error within an allowable error by delaying the start of a pulse distribution operation which is based on an item of command data subsequent to an item of command data now being executed. FIG. 7 is a diagram used to describe this embodiment of the method of the present invention. Blocks B1, B2 preceding and following a corner CP intersect at right angles at the corner CP. The preceding block B1 is parallel to the X axis, and the following block is parallel to the Y axis.

When the servo system involves a first-order characteristic, the cutting speed for cutting in the preceding block B1 drops exponentially from the commanded speed Vi in the vicinity of the corner, as shown in FIG. 7(B). At this time, the machining error differs depending upon whether the pulse distribution operation, based on command data in the following block B2, begins from time $t_o$ (solid line) at which deceleration starts in the preceding block B1, from time $t_2$ (dot-and-dash line) at which deceleration in block B1 ends, or from time $t_1$ (dashed line) intermediate times $t_0$ and $t_2$, as illustrated in FIG. 7(C). Thus, the longer the pulse distribution in the following block B2 is delayed, the smaller will be the machining error, as shown by the solid line, dashed line and dot-and-dash line of FIG. 7(A).

Figure 8:
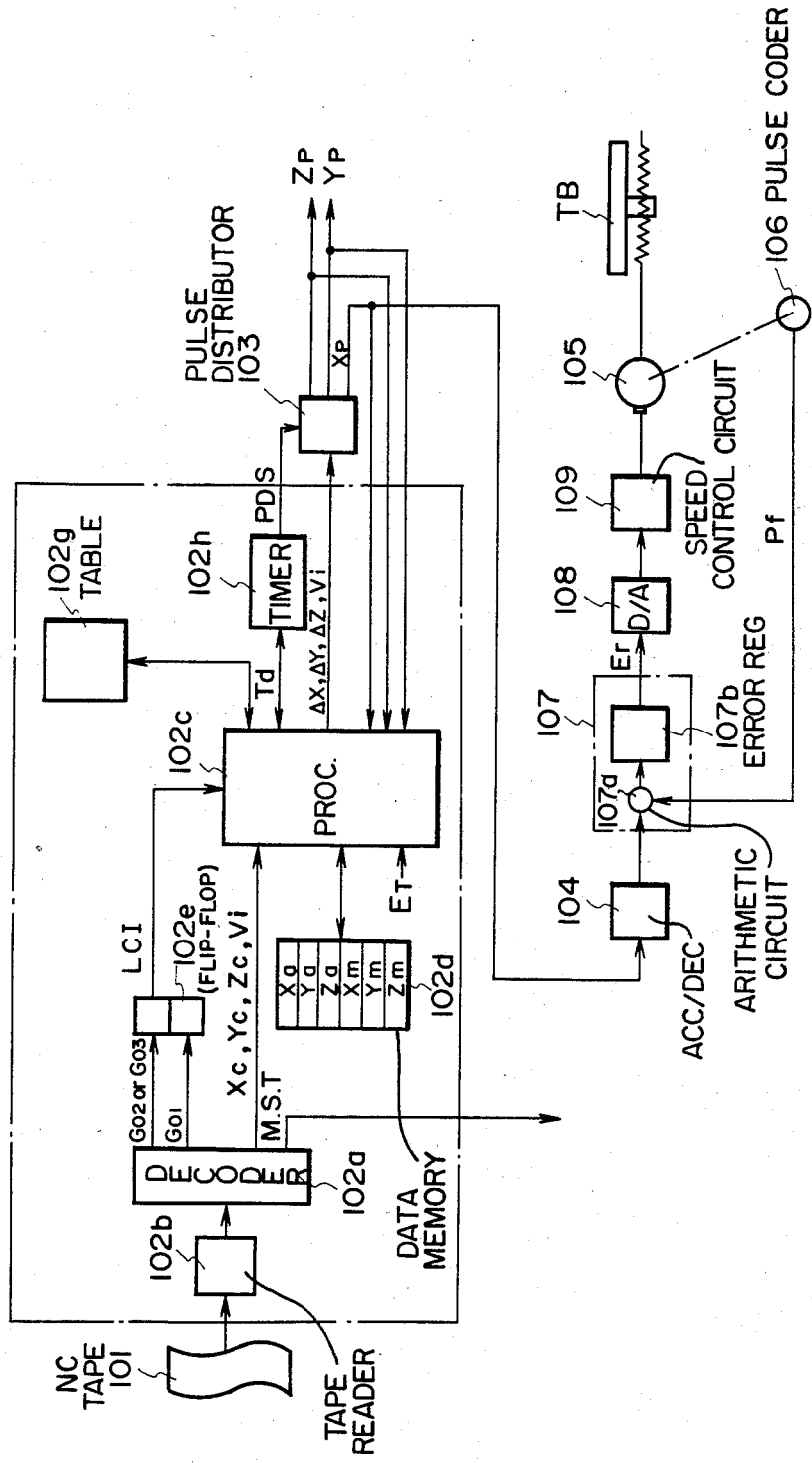
FIG. 8 is a block diagram of a system for performing a second embodiment of the method of the present invention.

FIG. 8 is a block diagram of a system for practicing the foregoing method. Portions similar to those shown in FIG. 6 are designated by like reference characters and a detailed description thereof is omitted.

FIG. 8 differs from FIG. 6 in that the point at which the pulse distribution starts in the following block is delayed in accordance with the allowable error and the machining error found from Eqs. (5) or (6). Specifically, the control unit 102 includes the processor 102c for computing the machining error Er from Eq. (5) or (6) and for computing a difference based on a machining error $E_r$, a table 102g for storing correspondence between errors and pulse distribution start delay times, and a timer 102h. The timer 102h applies a pulse distribution start signal PDS to the pulse distributor 103 upon passage of a delay time corresponding to the error. Thus, when machining data is read in from the NC tape 101, the processor 102c obtains the machining error $E_r$ by performing the operation of Eqs. (5) or (6) depending upon whether the prevailing mode is the linear interpolation mode (signal LCI="0") or circular interpolation mode (signal LCI="1"), and then computes the difference $(E_r - E_T)$ between the machining error $E_r$ and allowable error $E_T$. Next, a desired delay time Td is found from the table 102g based on the magnitude of the difference $(E_r - E_T)$. When the pulse distribution now being executed ends, that is, when the remaining amounts of movement Xm, Ym, Zm all become zero, the delay time Td is set in the timer 102h. Further, in parallel with the pulse distribution in the currently prevailing block, the processor 102c finds the incremental values $\Delta X$, $\Delta Y$, $\Delta Z$ for the respctive axes from the operations given by expression (7), as was described with reference to FIG. 6. Accordingly, when the pulse distribution now being executed ends, the processor 102c applies the incremental values to the pulse distributor 103 together with the speed command Vi.

Thereafter, when the delay time Td elapses, the pulse distribution start signal PDS is applied to the pulse distributor 103 which responds by starting a pulse distribution operation based on the already received command data in the following block. It should be noted that the pulse distribution start delay time is zero when the condition $E_r \leq E_T$ holds.

In accordance with the present invention as described above, feed speed is automatically limited or pulse distribution timing in a following block is delayed, so that a machining error caused by a servo delay during cutting of a corner or arc will not exceed an allowable error even when an NC tape is created without taking the machining error into consideration. Consequently, creation of the NC tape is greatly simplified and tape length is reduced since it is unnecessary to use instructions such as a dwell instruction G04. There is also no need to create an NC tape for each machine tool.

We claim:

1. A numerical control method for executing numerical control processing based on a machining program having plural items of command data, the numerical control processing being executed based on an item of command data which has been preread, comprising the steps of:

(a) computing and storing beforehand at least two upper limit feed speeds corresponding to first and second interpolation modes, based on an allowable machining error;
(b) selecting one of the upper limit feed speeds based on the one of the first and second interpolation modes corresponding to the shape into which a workpiece is to be machined;
(c) comparing the magnitude of the selected upper limit feed speed and the magnitude of a commanded feed speed; and
(d) clamping the actual feed speed to the selected upper limit feed speed when the commanded feed speed becomes greater than the selected upper limit feed speed.

2. A numerical control method according to claim 1, wherein said step (a) comprises computing and storing beforehand an upper limit feed speed for linear cutting and an upper limit feed speed for arc cutting, wherein the first and second interpolation modes comprises a linear interpolation mode and a circular interpolation mode, respectively, and wherein said step (b) comprises selecting one of the upper limit feed speeds for linear cutting or one of the upper limit feed speeds for arc cutting based on whether the prevailing mode is the linear interpolation mode or the circular interpolation mode.

3. A numerical control method for executing numerical control processing, including a pulse distribution operation, based on a machining program having plural items of command data, the numerical control processing being executed based on an item of command data which has been preread, comprising the steps of:
(a) computing a machining error based on an interpolation mode corresponding to a workpiece shape commanded by the machining program, and on a commanded speed;
(b) computing the value of a difference between an allowable error and the computed machining error;
(c) storing in memory, prior to said steps (a) and (b), the correspondence between a plurality of difference values and the delay times from the end of a pulse distribution operation, based on current command data, to the start of a pulse distribution operation based on succeeding command data;
(d) reading the delay time corresponding to the actual difference value computed in said step (b), out of the memory; and
(e) delaying, by the delay time, the start of the pulse distribution operation based on the succeeding command data.

4. A numerical control method according to claim 3, wherein said step (a) comprises determining whether the prevailing interpolation mode is a linear interpolation mode or a circular interpolation mode.

* * * * *

UNITED STATES PATENT AND TRADEMARK OFFICE
CERTIFICATE OF CORRECTION

PATENT NO. : 4,543,625
DATED : SEPTEMBER 24, 1985
INVENTOR(S) : RYOICHIRO NOZAWA ET AL.

It is certified that error appears in the above-identified patent and that said Letters Patent is hereby corrected as shown below:

Col. 1, line 12, "techniques" should be --technique--.

Col. 5, line 19, "$\Delta XYc-Ya$" should be --$\Delta X$, $Yc-Ya$--; and

"$\Delta YZc$" should be --$\Delta Y$, $Zc$--;

line 27, "$\Delta Y,Zm$" should be --$\Delta Y$, $Zm$--;

line 60, "102t" should be --102f--.

Col. 6, line 19, "pulse" should be --pulses--.

Col. 8, line 38, "respctive" should be --respective--;
line 54, "caused" should be --(caused--;
line 55, "arc" should be --arc)--.

Col. 9, line 22, "comprises" should be --comprise--.

Signed and Sealed this

Seventh Day of January 1986

[SEAL]

Attest:

DONALD J. QUIGG

Attesting Officer    Commissioner of Patents and Trademarks